Patented Aug. 10, 1954

2,686,174

UNITED STATES PATENT OFFICE 2,686,174

MASS POLYMER CASTING OF α-CHLORO-ACRYLIC ACID ESTERS

Harry D. Anspon, Easton, and Frank E. Pschorr, Tatamy, Pa., assignors to General Aniline & Film Corporation, New York, N. Y., a corporation of Delaware No Drawing. Application December 30, 1950, Serial No. 203,786

6 Claims. (Cl. 260—89.5)

This invention relates to an improvement in the casting of polymers of α-chloroacrylic acid esters by mass polymerization of the corresponding monomer in a mold comprising a rigid mold surface of glass or similar vitreous ceramic material, and to the polymerizable compositions employed in said process.

In the mass polymerization of esters of α-chloroacrylic acid, e. g. methyl α-chloroacrylate, in glass or similar vitreous ceramic molds, adhesion of the polymer to the vitreous surface of the mold presents a serious problem. Substantial shrinkage in volume occurs during polymerization of monomeric α-chloroacrylic acid esters (e. g. about 23% shrinkage in the case of methyl α-chloroacrylate). When a glass mold is employed for casting polymers of the aforesaid monomers, e. g. in casting polymer sheets or rods, the polymer produced tends to adhere so firmly to the glass portions of the mold that shrinkage of the mold contents during polymerization or on cooling causes fracture of the mold or the polymer, or both. Adhesion is so pronounced in the case of methyl α-chloroacrylate that glass fragments are often torn from a glass mold surface by the polymer.

Incorporation of alcohols such as methanol or ethanol in minor amounts in the monomer as described in U. S. patent application Serial No. 601,342, filed June 23, 1945, for rendering color-generating impurities innocuous in the ester monomer, is also effective to facilitate separation of the polymer from glass molds, but only when the alcohol is present in such amounts as to reduce the softening point of the polymer by about 10° C. or more, as compared with a polymer produced in the absence of the added alcohol. When a relatively pure ester monomer is employed, containing no added color-inhibiting reagent of the type disclosed in the aforesaid patent application, a polymer of increased hardness and heat resistance is produced, but the polymer adheres firmly to the glass portions of the mold, causing fracture of the mold or the polymer.

We have discovered that the aforesaid adhesion of mass polymers of α-chloroacrylic acid esters can be avoided by incorporating in the monomer, prior to polymerization, a small amount, e. g. 0.005 to 0.1% of the weight of the monomer of a diester of sulfosuccinic acid in which the carboxyl groups are esterified with a monohydric alcohol of at least 6 and preferably 6 to 12 carbon atoms, such ester being in the form of the free sulfo acid or in the form of a salt thereof, e. g. an alkali metal or ammonium salt. Suitable esters of the aforesaid type are dihexyl-, dioctyl-, dinonyl-, didecyl-, and dilauryl-sodium sulfosuccinates or the corresponding free sulfonic acids.

Not only does a trace of the sulfosuccinic acid diester obviate adhesion of the α-chloroacrylic ester polymer to glass mold surfaces, but in the aforesaid concentrations, it remains fully compatible with the polymer, causing no decrease in optical transparency, no appreciable decrease in softening point or hardness of the polymer, and has no adverse effect on the polymerization of the monomer or the ageing properties of the polymer.

The improved casting method of our invention, and the compositions employed and produced therein are illustrated by the following example, wherein parts and percentages are by weight.

*Example*

To a quantity of liquid monomeric methyl α-chloroacrylate, purified by fractional distillation under reduced pressure and maintained thereafter in an oxygen-free atmosphere to prevent formation of autooxidation products, there was added a quantity of dioctyl-sodium sulfosuccinate in an amount corresponding to 0.01% of the amount of methyl α-chloroacrylate. At the same time, a quantity of ditertiary butyl peroxide was added to serve as a polymerization catalyst amounting to 0.06% of the methyl α-chloroacrylate. The monomer containing the aforesaid adjuvants was transferred to a mold consisting of a pair of plate glass sheets of similar size and shape, held in spaced parallel face-to-face relation (about $\frac{5}{16}$ inch apart) with their edges in mutual alignment and joined by a yieldable edge closure enclosing the space between the plates except for a filler opening. When the mold was filled with the monomer, the filler opening was sealed and the mold and its contents heated at about 60° C. for 72 hours, and then at about 120° C. for 24 hours to complete polymerization. On cooling, the glass plates were readily separated from the polymer sheet contained between them, without breakage or marring of the mold plates or of the polymer sheet. The sheet obtained had the same softening point as one similarly produced but without addition of dioctyl-sodium sulfosuccinate, and was colorless and completely transparent. On protracted exposure to ultra-violet light under atmospheric conditions, no discoloration or other deterioration of the polymer plate was observed.

On the other hand, when methyl α-chloroacrylate, similarly purified, was polymerized in a glass tube or in a mold similar to that employed in the example, by ultraviolet light without addition of the sulfosuccinic acid diester, the tube and the mold plates cracked after the polymerization proceeded beyond the stage at which the contents were still fluid.

Other esters of α-chloroacrylic acid, for example, alkyl esters such as ethyl, propyl, isopropyl, butyl, amyl, isoamyl, hexyl, octyl or lauryl esters; alkenyl esters such as allyl, methallyl or crotyl esters; polyhydric alcohol esters such as the ethylene glycol or 1,4-butanediol esters; cycloalkyl esters such as cyclohexyl or methylcyclohexyl esters; aralkyl esters such as the benzyl ester; aryl esters such as phenyl or tolyl esters, and heterocyclic esters such as the tetrahydrofurfuryl ester, can be similarly modified by incorporation of sulfosuccinic acid diester as illustrated in the example, to prevent adhesion of the polymer to the glass mold. The concentration of the sulfosuccinic acid diester can vary from 0.005 to 0.1% of the α-chloroacrylic ester monomer.

Variations and modifications which will be obvious to those skilled in the art can be made in the procedure and compositions of this invention without departing from the scope or spirit thereof.

We claim:

1. In a process involving mass polymerization of an α-chloroacrylic acid ester of an alcohol containing no substituent functional groups other than alcoholic hydroxyl groups in contact with a vitreous mold surface, the improvement which comprises incorporating in said ester from 0.005 to 0.1% of its weight of a sulfosuccinic acid diester of a saturated monohydric alcohol having an alkyl radical of at least 6 carbon atoms attached to the hydroxyl group, and polymerizing the α-chloroacrylic acid ester containing said sulfosuccinic acid diester in contact with said mold surface.

2. In a process involving mass polymerization of methyl α-chloroacrylate in contact with a vitreous mold surface, the improvement which comprises incorporating in the methyl α-chloroacrylate from 0.005 to 0.1% of its weight of a sulfosuccinic acid diester of a saturated monohydric alcohol having an alkyl radical of 6 to 12 carbon atoms attached to the hydroxyl group, and polymerizing the composition in contact with said mold surface.

3. In a process for casting sheets of polymeric methyl α-chloroacrylate by mass polymerization of a layer of methyl α-chloroacrylate between and in contact with a pair of spaced glass plates, the improvement which comprises incorporating in the monomer, prior to polymerization thereof, from 0.005 to 0.1% of its weight of a dioctyl sulfosuccinate.

4. A composition of matter essentially consisting of a solution, in a polymerizable α-chloroacrylic acid ester of an alcohol containing no substituent functional groups other than alcoholic hydroxyl groups, of a sulfosuccinic acid diester of a saturated monohydric alcohol having an alkyl radical of at least 6 carbon atoms attached to the hydroxyl group, amounting to 0.005 to 0.1% of the weight of said α-chloroacrylic acid ester.

5. A composition of matter essentially consisting of a solution, in monomeric methyl α-chloroacrylate, of a sulfosuccinic acid diester of a saturated monohydric alcohol having an alkyl radical of 6 to 12 carbon atoms attached to the hydroxyl group, amounting to 0.005 to 0.1% of the weight of said methyl α-chloroacrylate.

6. A composition of matter essentially consisting of a solution, in monomeric methyl α-chloroacrylate, of a dioctyl sulfosuccinate amounting to 0.005 to 0.1% of the weight of said methyl α-chloroacrylate.

References Cited in the file of this patent

UNITED STATES PATENTS

| Number | Name | Date |
|---|---|---|
| 2,275,716 | Bachman et al. | Mar. 10, 1942 |
| 2,473,708 | Hayes | June 21, 1949 |